United States Patent
Mizuma

(10) Patent No.: US 9,625,688 B2
(45) Date of Patent: Apr. 18, 2017

(54) OPTICAL SYSTEM AND IMAGING APPARATUS INCLUDING THE SAME

(71) Applicant: CANON KABUSHIKI KAISHA, Tokyo (JP)

(72) Inventor: Akira Mizuma, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 14/675,430

(22) Filed: Mar. 31, 2015

(65) Prior Publication Data

US 2015/0205081 A1    Jul. 23, 2015

Related U.S. Application Data

(62) Division of application No. 13/801,467, filed on Mar. 13, 2013, now abandoned.

(30) Foreign Application Priority Data

Mar. 28, 2012  (JP) ................................. 2012-072806

(51) Int. Cl.
  *G02B 27/64*  (2006.01)
  *G02B 15/15*  (2006.01)
  (Continued)

(52) U.S. Cl.
  CPC ............... *G02B 15/15* (2013.01); *G02B 9/64* (2013.01); *G02B 13/04* (2013.01); *G02B 15/16* (2013.01);
  (Continued)

(58) Field of Classification Search
  CPC ...... G02B 27/64; G02B 27/646; G02B 15/14; G02B 15/22
  See application file for complete search history.

(56) References Cited

U.S. PATENT DOCUMENTS 5,627,677 A * 5/1997 Suzuki ................. G02B 27/646
                                                                    359/557
2011/0090574 A1 * 4/2011 Harada .................. G02B 13/18
                                                                    359/717
(Continued)

FOREIGN PATENT DOCUMENTS

JP    H09113800 A    5/1997
JP    2000258686 A    9/2000
(Continued)

*Primary Examiner* — Thong Nguyen
(74) *Attorney, Agent, or Firm* — Canon USA, Inc. IP Division

(57) ABSTRACT

In an optical system in which a focal length of an entire system is shorter than a back focus, an image stabilizing lens unit, is at a position adjacent to an aperture on an image side and a cemented lens obtained by cementing a positive lens and a negative lens is on an object side of the aperture diaphragm, and the focal length of the entire system, a focal length of the image stabilizing lens unit, a focal length of the cemented lens, a distance on the optical axis from the aperture to a lens surface on the object side of the image stabilizing lens unit, and a distance on the optical axis from a first lens surface on a side closest to an object to a final lens surface on a side closest to an image when an infinite-distance object is brought into focus are set.

8 Claims, 13 Drawing Sheets

(51) Int. Cl.
*G02B 9/64* (2006.01)
*G02B 13/04* (2006.01)
*G02B 15/16* (2006.01)
*H04N 5/232* (2006.01)

(52) U.S. Cl.
CPC ....... *G02B 27/646* (2013.01); *H04N 5/23287* (2013.01)

(56) References Cited

U.S. PATENT DOCUMENTS

| | | | | |
|---|---|---|---|---|
| 2011/0317278 A1* | 12/2011 | Sato | ................... | G02B 15/177 359/682 |
| 2012/0033300 A1* | 2/2012 | Nakahara | ............... | G02B 13/18 359/557 |
| 2014/0098253 A1* | 4/2014 | Maetaki | ............... | G02B 15/177 348/208.11 |

FOREIGN PATENT DOCUMENTS

| | | | |
|---|---|---|---|
| JP | 2004226740 A | 8/2004 |
| JP | 2009008845 A | 1/2009 |
| JP | 2010145759 A | 7/2010 |
| JP | 2011059288 A | 3/2011 |
| JP | 2011-197058 A | 10/2011 |
| JP | 2012008268 A | 1/2012 |
| JP | 2012047813 A | 3/2012 |

* cited by examiner

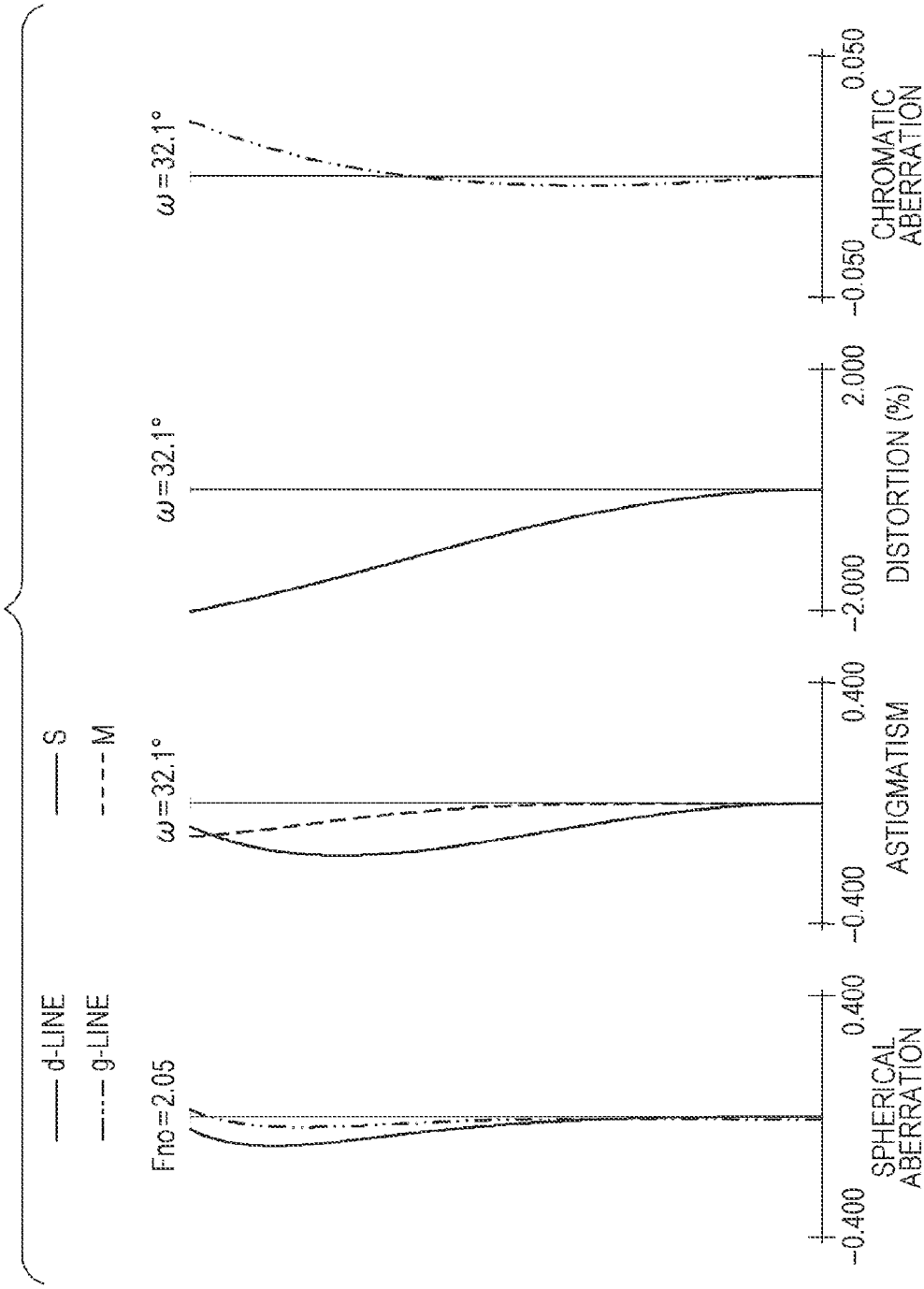

OPTICAL SYSTEM AND IMAGING APPARATUS INCLUDING THE SAME

BACKGROUND OF THE INVENTION

Field of the Invention

The present invention relates to an optical system and is suitable as an imaging optical system used in an imaging apparatus such as a silver-halide film camera, a digital still camera, a video camera, a digital video camera, a monitoring camera, and a broadcasting camera, for example.

Description of the Related Art

It is required that the imaging optical system used in the imaging apparatus have high optical performance across an entire image area and that various aberrations thereof be corrected in an excellent manner. The imaging optical system is also required to have an image stabilizing mechanism for inhibiting deterioration in image due to an effect of vibration such as a camera shake at the time of shooting. As the image stabilizing mechanism, a method of correcting variation in image position caused by the camera shake and the like by moving a part of lens units of the optical system in a direction including a component perpendicular to the optical axis is known.

It is known that the image stabilizing mechanism is used in a retrofocus-type wide-angle lens in which a focal length of an entire system is shorter than a back focus.

In order to obtain excellent optical performance by correcting an image shake at the time of vibration of the optical system, it is important to arrange the image stabilizing mechanism in an appropriate position of the imaging optical system.

U.S. Pat. No. 5,917,663 discloses that the wide-angle lens including a lens unit with negative refractive power and a lens unit with positive refractive power in order from an object side performs image stabilization by rotational movement of two positive lenses on a side closest to an image around a point on the optical axis.

Therefore, an incident position of a principal ray of an off-axis ray incident on an image stabilizing lens unit becomes high and there is a tendency that image-plane variation occurs at the time of the image stabilization in the off-axis ray and aberration correction at the time of the image stabilization becomes difficult. Also, the incident height of the off-axis ray incident on the image stabilizing lens unit becomes high and there is a tendency that coma aberration variation becomes large at the time of the image stabilization and the optical performance is deteriorated. Therefore, it is difficult to realize a large aperture ratio of the wide-angle lens disclosed in U.S. Pat. No. 5,917,663.

In order to correct the image shake at the time of the vibration of the optical system while maintaining the excellent optical performance, a lens configuration and refractive power of the image stabilizing lens unit are important and it is also important to arrange the image stabilizing lens unit at an appropriate position in an optical path.

An object of an embodiment of the present invention is to provide an optical system capable of easily obtaining a high-quality image across the entire image plane and of easily maintaining the excellent optical performance also at the time of the image stabilization with a wide angle of view and the large aperture ratio.

SUMMARY OF THE INVENTION

An optical system of an embodiment of the present invention is an optical system of which a focal length of an entire system is shorter than a back focus, wherein, when an image stabilizing lens unit, which moves in a direction including a component perpendicular to an optical axis to move an imaging position, is arranged at a position adjacent to an aperture diaphragm on an image side, a cemented lens obtained by cementing a positive lens and a negative lens is arranged on an object side of the aperture diaphragm, the focal length of the entire system is set to f, a focal length of the image stabilizing lens unit is set to fis, a focal length of the cemented lens is set to fc, a distance on the optical axis from the aperture diaphragm to a lens surface on the object side of the image stabilizing lens unit is set to Dis, and a distance on the optical axis from a first lens surface on a side closest to an object to a final lens surface on a side closest to an image when an Infinite-distance object is brought into focus is set to DL, condition equations $0.00 < Dis/DL < 0.25,$ $0.3 < fis/f < 3.5,$ and $0.3 < -fc/fis < 3.5$ are satisfied.

Further features of the present invention will become apparent from the following description of exemplary embodiments (with reference to the attached drawings).

BRIEF DESCRIPTION OF THE DRAWINGS

FIG. 11 is a longitudinal aberration diagram of the fourth embodiment;

DESCRIPTION OF THE EMBODIMENTS

A preferred embodiment of the present invention is hereinafter described in detail with reference to the attached drawings. In an optical system of an embodiment of the present invention, a focal length of an entire system is shorter than a back focus. An image stabilizing lens unit, which moves in a direction including a component perpendicular to an optical axis to move an imaging position, is arranged at a position adjacent to an aperture diaphragm on an image side. A cemented lens obtained by cementing a positive lens and a negative lens is arranged on an object side of the aperture diaphragm.

Figure 1:
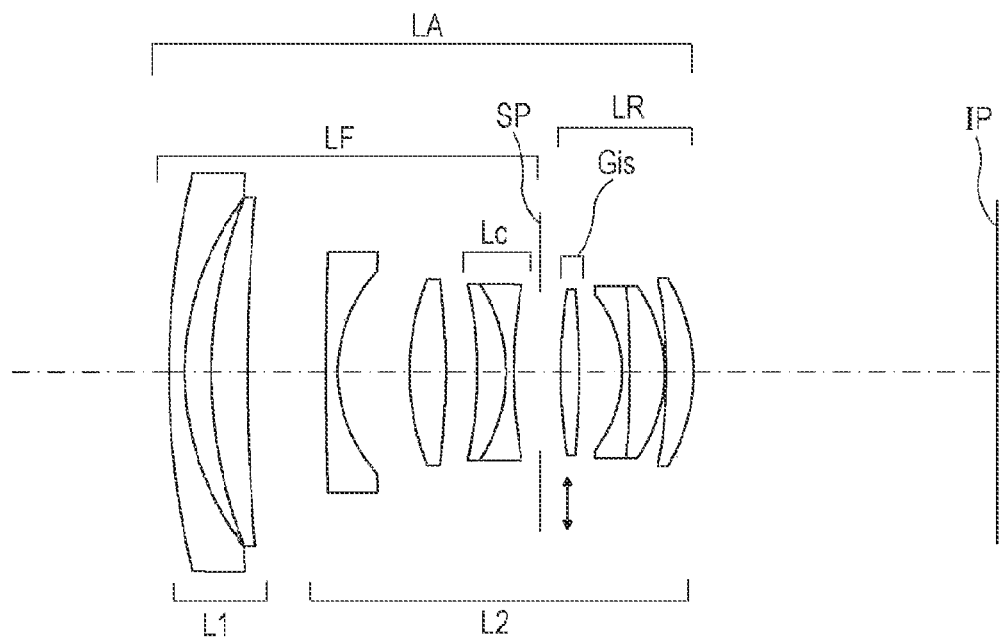
FIG. 1 is a cross-sectional view of a lens of a first embodiment.
Figure 2:
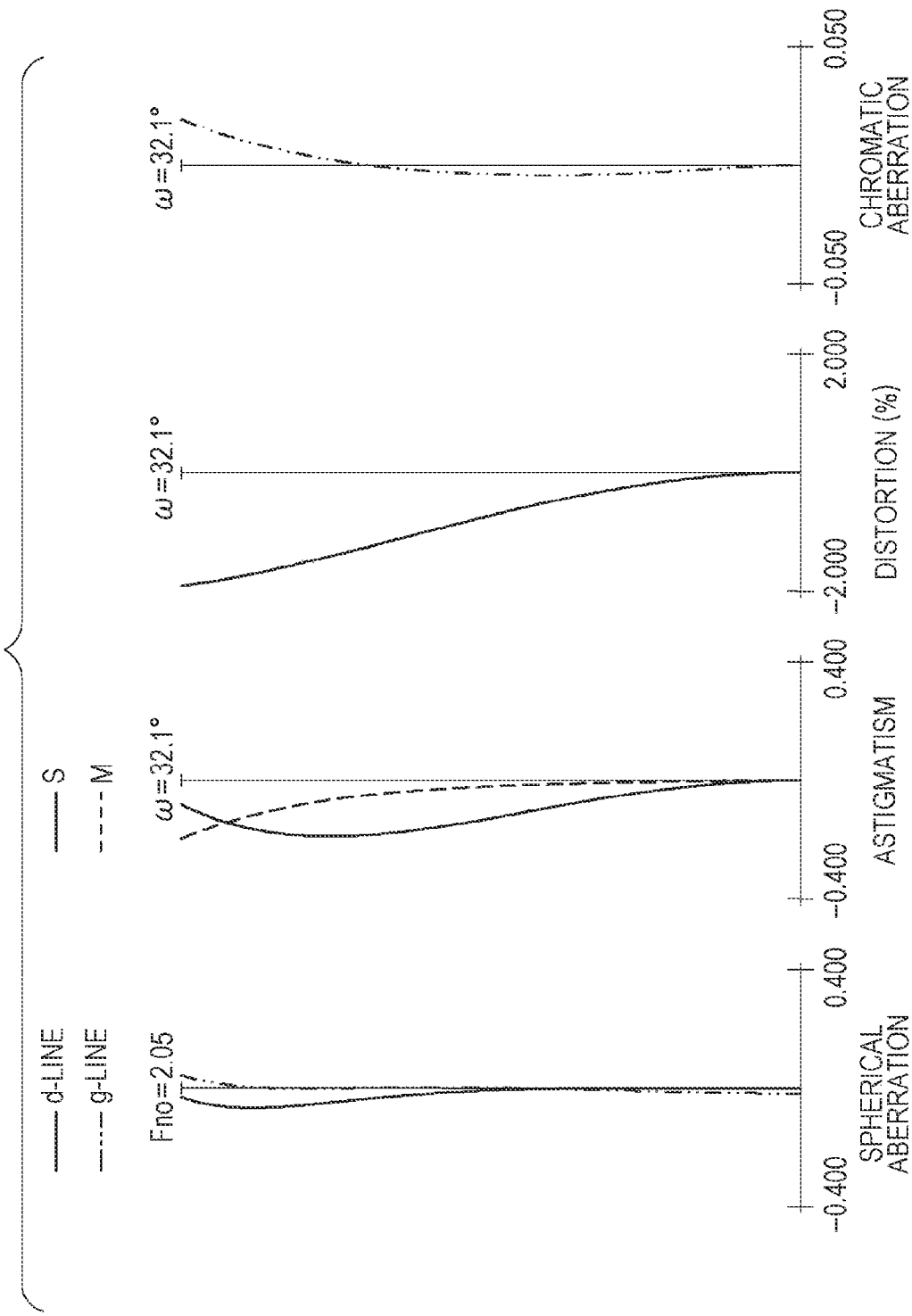
FIG. 2 is a longitudinal aberration diagram of the first embodiment.
Figure 3A:
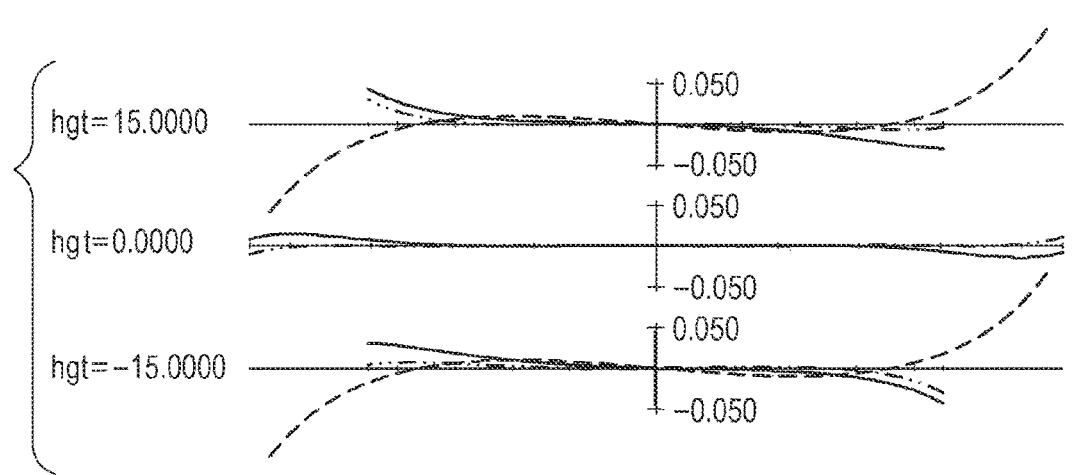
FIGS. 3A and 3B are lateral aberration diagrams in a reference state and at the time of 0.3° image stabilization correction of the first embodiment of the present invention, respectively.
Figure 3B:
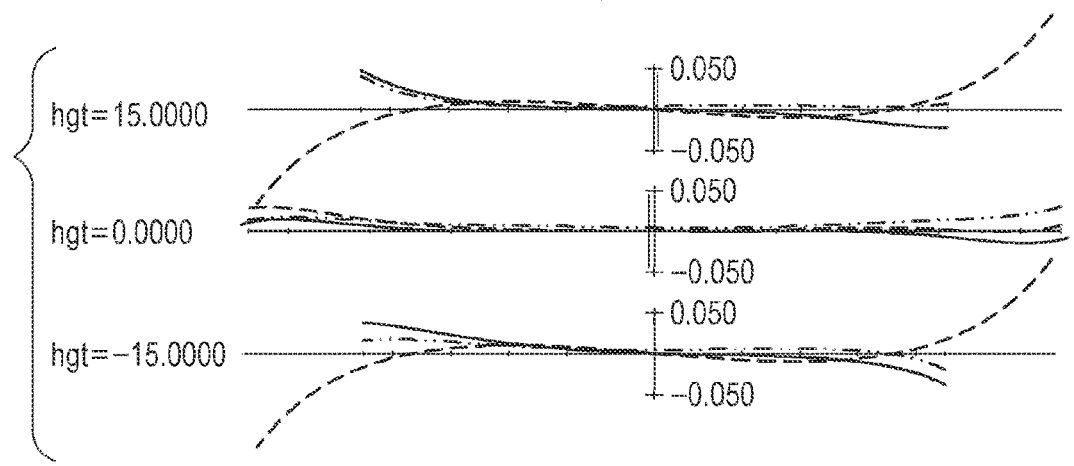
Figure 4:
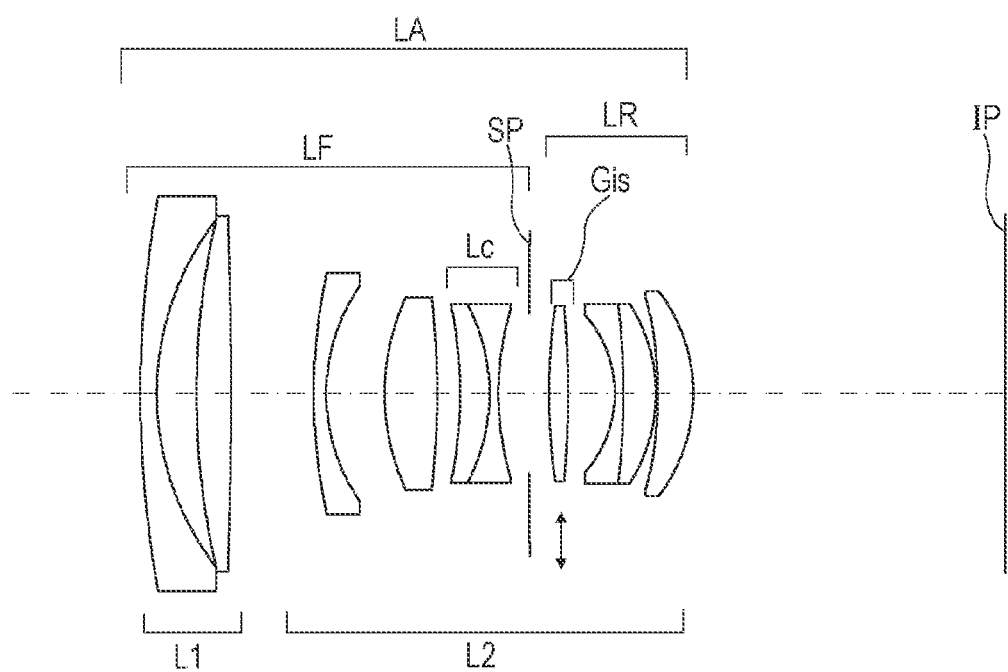
FIG. 4 is a cross-sectional view of a lens of a second embodiment.
Figure 5:
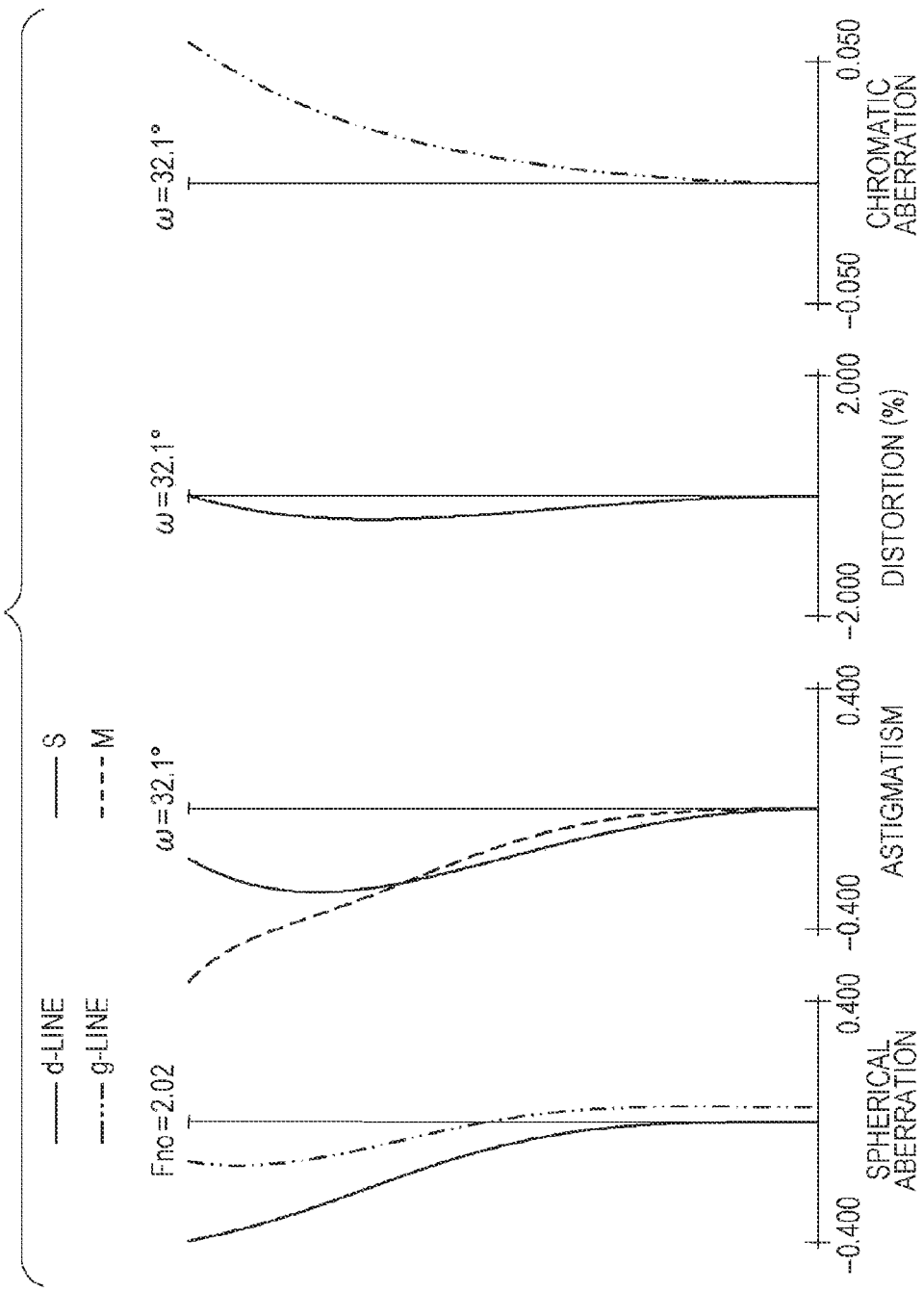
FIG. 5 is a longitudinal aberration diagram of the second embodiment.
Figure 6A:
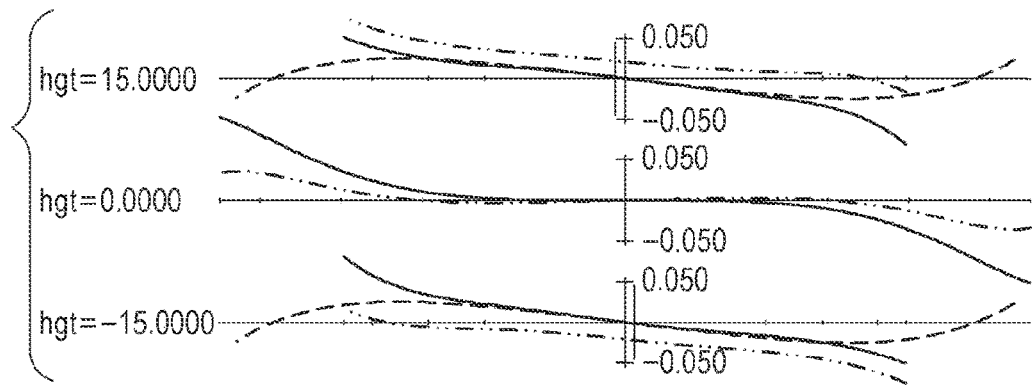
FIGS. 6A and 6B are lateral aberration diagrams in a reference state and at the time of 0.3° image stabilization correction of the second embodiment of the present invention, respectively.
Figure 6B:
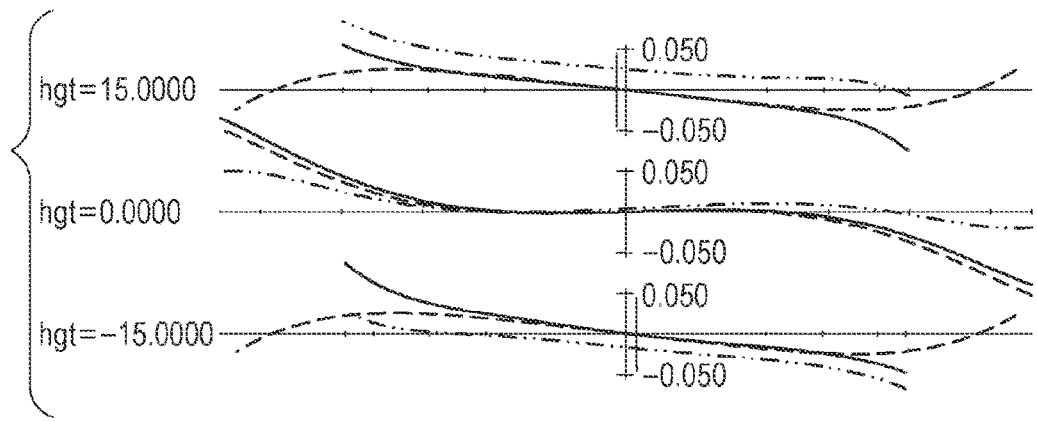

FIG. 1 is a cross-sectional view of a lens of a first embodiment of the present invention and FIG. 2 is a longitudinal aberration diagram when an infinite-distance object is brought into focus of the first embodiment. FIGS. 3A and 3B are lateral aberration diagrams in a reference state and at the time of 0.3° image stabilization correction of the first embodiment of the present invention, respectively. FIG. 4 is a cross-sectional view of a lens of a second embodiment of the present invention and FIG. 5 is a longitudinal aberration diagram when an infinite-distance object is brought into focus of the second embodiment. FIGS. 6A and 6B are lateral aberration diagrams in a reference state and at the time of 0.3° image stabilization correction of the second embodiment of the present invention, respectively.

Figure 7:
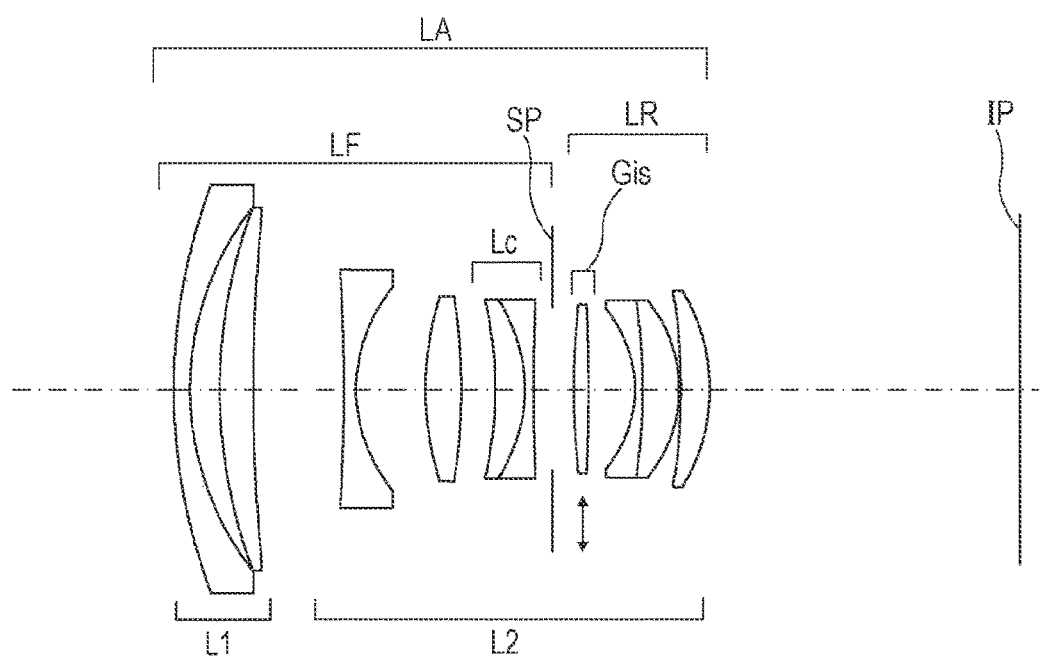
FIG. 7 is a cross-sectional view of a lens of a third embodiment.
Figure 8:
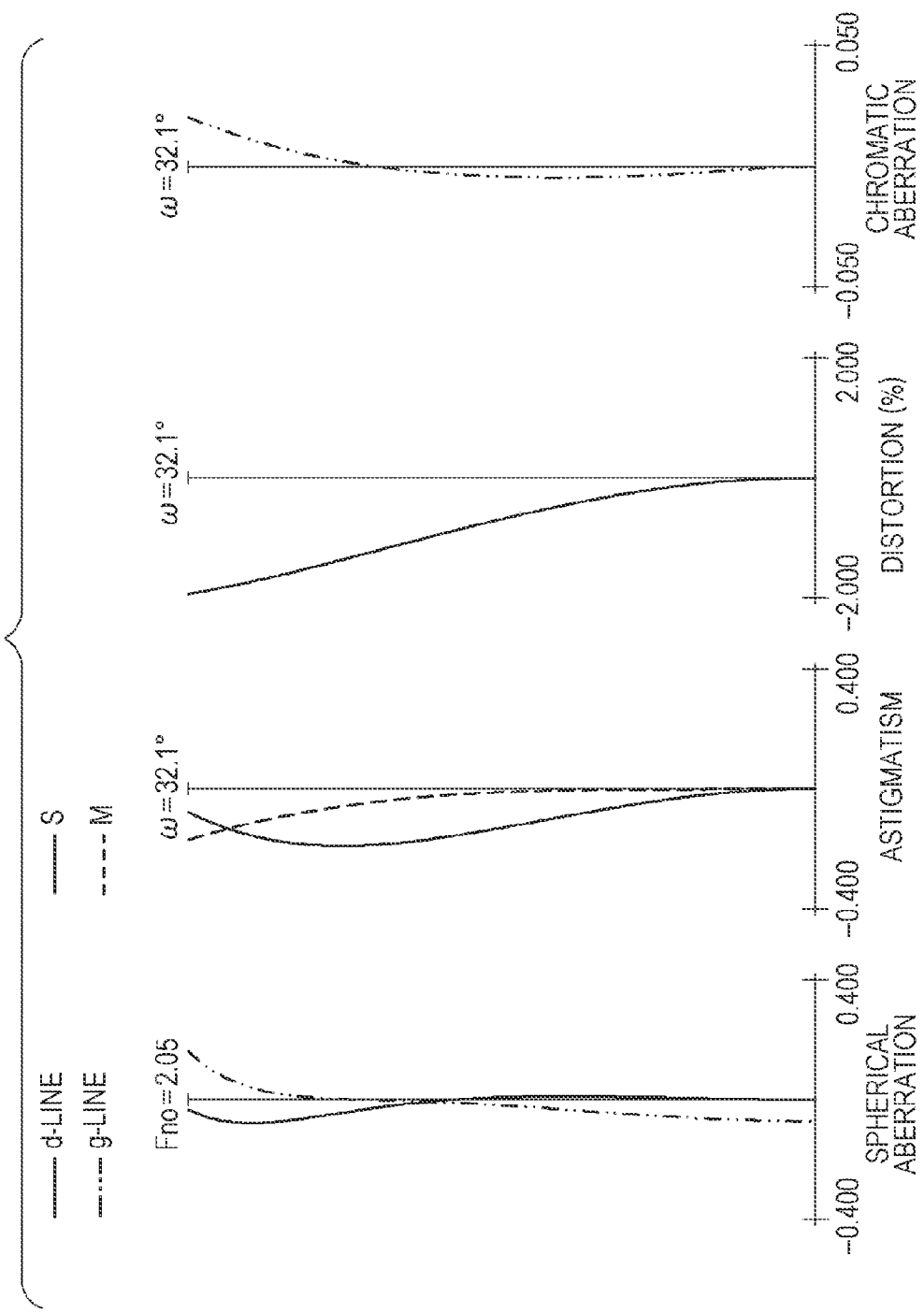
FIG. 8 is a longitudinal aberration diagram of the third embodiment.
Figure 9A:
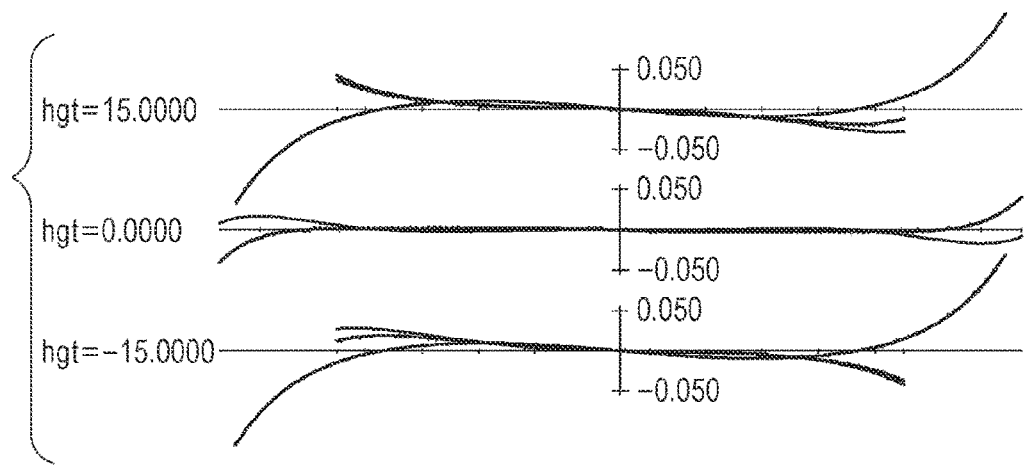
FIGS. 9A and 9B are lateral aberration diagrams in a reference state and at the time of 0.3° image stabilization correction of the third embodiment of the present invention, respectively.
Figure 9B:
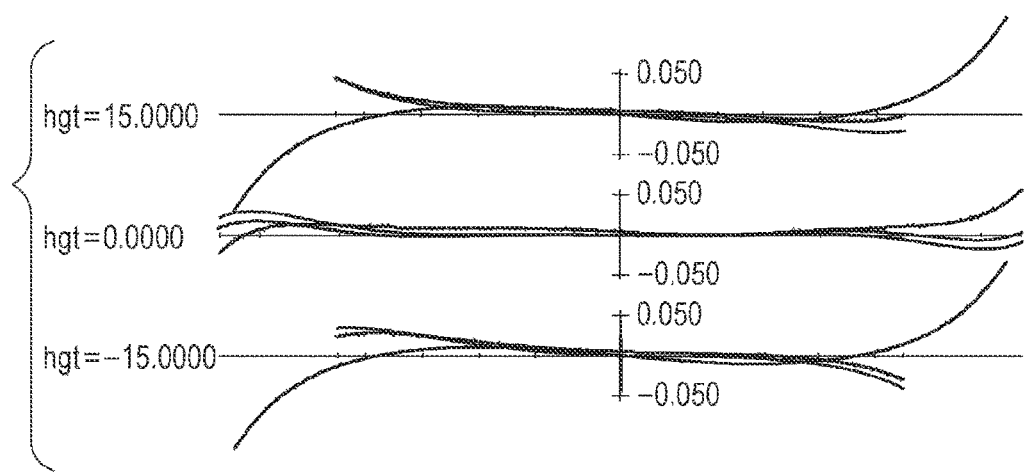
Figure 10:
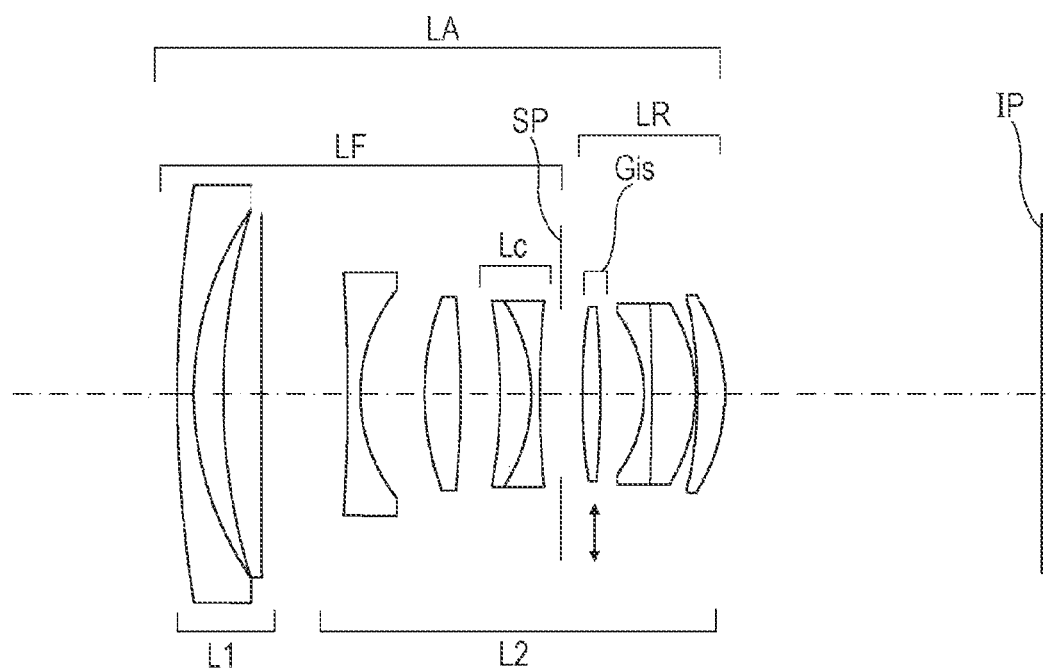
FIG. 10 is a cross-sectional view of a lens of a fourth embodiment.
Figure 12A:
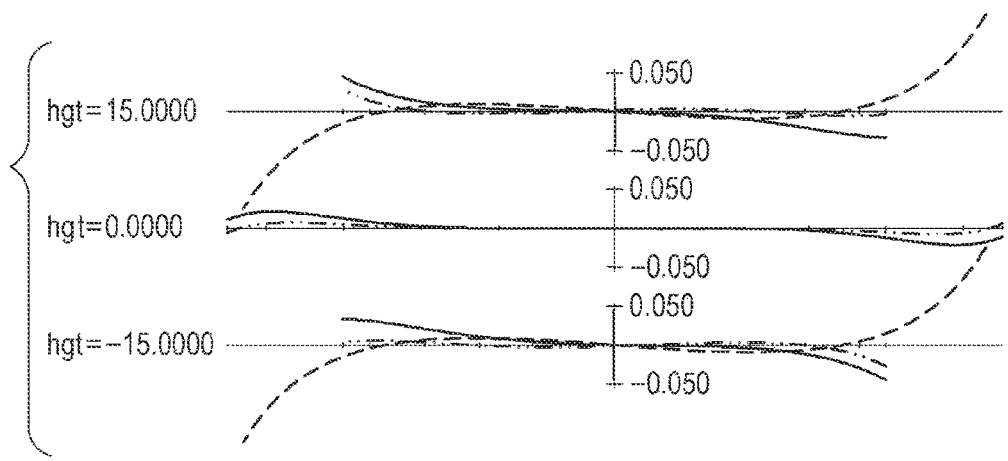
FIGS. 12A and 12B are lateral aberration diagrams in a reference state and at the time of 0.3° image stabilization correction of the fourth embodiment of the present invention, respectively.
Figure 12B:
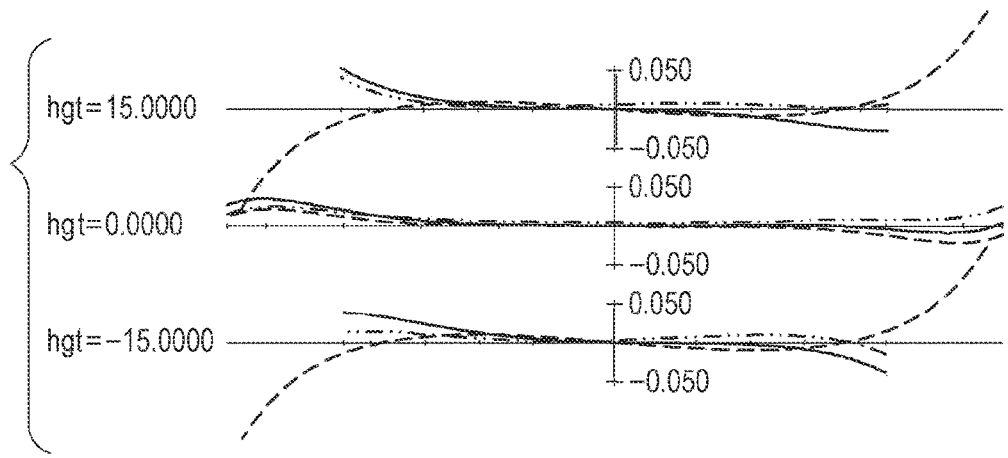
Figure 13:
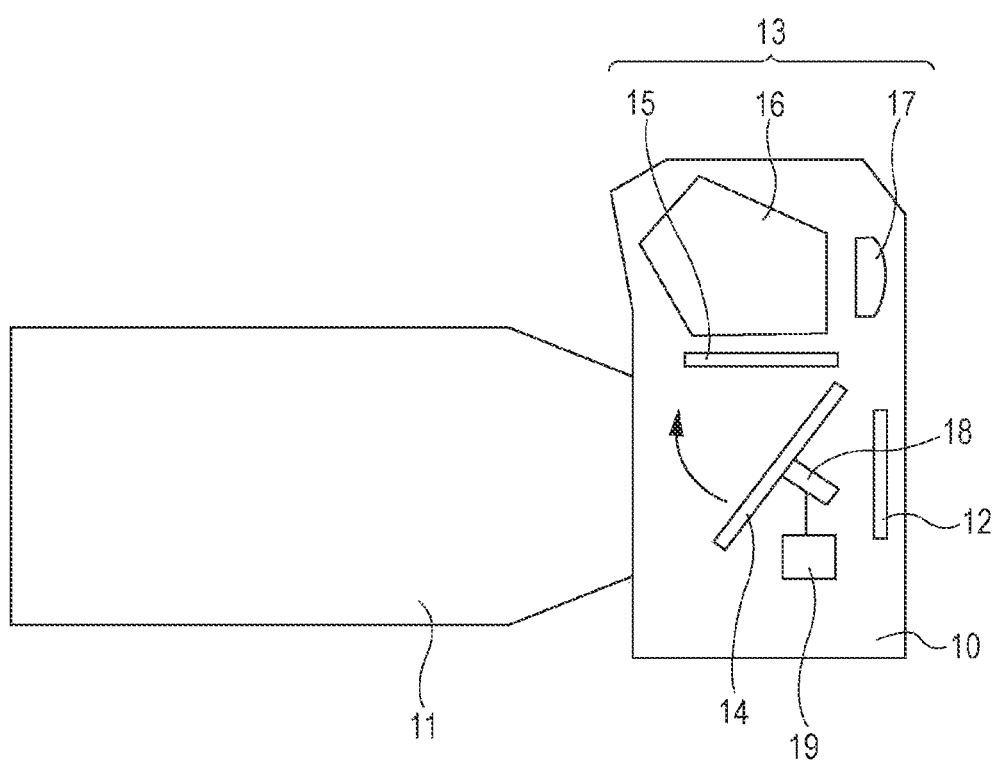
FIG. 13 is a schematic diagram of a substantial part of an imaging apparatus according to an embodiment of the present invention.

FIG. 7 is a cross-sectional view of a lens of a third embodiment of the present invention and FIG. 8 is a longitudinal aberration diagram when an infinite-distance object is brought into focus of the third embodiment. FIGS. 9A and 9B are lateral aberration diagrams in a reference state and at the time of 0.3° image stabilization correction of the third embodiment of the present invention, respectively. FIG. 10 is a cross-sectional view of a lens of a fourth embodiment of the present invention and FIG. 11 is a longitudinal aberration diagram when an infinite-distance object is brought into focus of the fourth embodiment. FIGS. 12A and 12B are lateral aberration diagrams in a reference state and at the time of 0.3° image stabilization correction of the fourth embodiment of the present invention, respectively. FIG. 13 is a schematic diagram of a substantial part of a single-lens reflex camera (imaging apparatus) provided with the optical system in an embodiment of the present invention.

The optical system of each embodiment is an imaging optical system used in the imaging apparatus (optical apparatus) such as a digital still camera, a video camera, and a silver-halide film camera. In the cross-sectional view of the lens, a left side is the object side (front side) and a right side is the image side (rear side). Meanwhile, the optical system of each embodiment may also be used as a projection lens of a projector and the like. At that time, the left side is a screen and the right side is an image to be projected.

In the cross-sectional view of the lens, a reference sign LA represents the optical system. The optical system LA includes a front lens unit LF on the object side and a rear lens unit LR with positive refractive power on the image side across an aperture diaphragm SP. Reference signs L1 and L2 represent a first lens unit with positive or negative refractive power, which does not move during focusing, and a second lens unit with positive refractive power, which moves during focusing, respectively.

The second lens unit L2 includes a lens unit on each of the object side and the image side of the aperture diaphragm (diaphragm) SP. The second lens unit L2 includes an image stabilizing lens unit Gis including a single lens or a cemented lens at the position adjacent to the aperture diaphragm SP on the image side. A reference sign Lc represents the cemented lens with negative refractive power arranged on the object side of the image stabilizing lens unit Gis. A reference sign IP represents an image plane, which corresponds to an image sensing plane of a solid-state image sensing device (photoelectric transducer) such as a CCD sensor and a CMOS sensor when the imaging optical system is used as that of the video camera and the digital still camera and corresponds to a film plane when this is used in the silver-halide film camera.

Each longitudinal aberration diagram illustrates a spherical aberration, astigmatism, a distortion, and a magnification chromatic aberration in order from left to right. In the diagrams, which illustrate the spherical aberration and the magnification chromatic aberration, a solid line indicates a d-line (587.6 nm) and a broken line indicates a g-line (435.8 nm). In the diagram, which illustrates the astigmatism, a solid line S indicates a sagittal direction of the d-line and a broken line M indicates a meridional direction of the d-line. The diagram, which illustrates the distortion, illustrates the distortion in the d-line. In the lateral aberration diagram, a solid line, a broken line, and a two-dot chain line indicate the meridional direction of the d-line, the sagittal direction of the d-line, and the meridional direction of the g-line, respectively. Reference signs Fno, ω, and hgt represent an F-number, a half angle of view (degree) of an angle of view for shooting, and an image height, respectively.

A specific configuration of the optical system of an embodiment of the present invention is an imaging optical system including the first lens unit L1 with positive or negative refractive power and the second lens unit L2 with positive refractive power in order from the object side to the image side. The imaging optical system performs focusing by moving the second lens unit L2 on the optical axis. The first lens unit L1 includes a negative lens in a meniscus shape having a convex surface on the object side and a positive lens having a surface in a convex shape on the object side in order from the object side to the image side. The second lens unit L2 includes a lens with negative refractive power (negative lens) in the meniscus shape having a concave surface on the image side, a lens with positive refractive power (positive lens), the cemented lens with negative refractive power obtained by cementing the positive lens and the negative lens, and the aperture diaphragm in order from the object side to the image side.

The second lens unit L2 further includes the image stabilizing lens unit Gis with positive refractive power, which reduces an image shake by moving in the direction including the component in the direction perpendicular to the optical axis, a cemented lens obtained by cementing a negative lens and a positive lens, and a positive lens on the image side of the aperture diaphragm SP.

In general, in the imaging optical system, a height of an off-axis ray at a maximum angle of view from the optical axis is higher as a distance from the aperture diaphragm SP in an optical axis direction is larger. Therefore, an effective ray diameter of the lens arranged at a position apart from the aperture diaphragm SP becomes larger. Therefore, when the image stabilizing lens unit Gis is arranged in the vicinity of the aperture diaphragm SP, the effective ray diameter thereof becomes smaller and a small lens diameter may be easily realized even when movement for image stabilization is taken into account. Since an incident height of a ray, which passes through the image stabilizing lens unit Gis, is low, aberration variation at the time of the image stabilization may easily be made small.

Therefore, in the optical system of each embodiment, the image stabilizing lens unit is arranged in a position near the aperture diaphragm SP as described above for inhibiting an effective diameter of the image stabilizing lens unit from becoming large. As a result, a load on a driving mechanism of the image stabilizing lens is decreased and an entire lens may be made compact easily. At the same time, the lens unit at the position near the aperture diaphragm SP in an entire system is made the image stabilizing lens unit, which moves in the direction including the component in the direction perpendicular to the optical axis. According to this, the optical system in which the height of the off-axis ray, which passes through the image stabilizing lens unit, is low and the aberration variation of the off-axis ray at the time of the image stabilization is small is realized.

Especially, when a large aperture is realized, a lens diameter of the optical system becomes larger and the lens diameter of the image stabilizing lens unit also becomes larger. The image stabilizing lens unit becomes heavier along with the increase in lens diameter and an image stabilizing driving mechanism becomes further larger. When the large aperture is realized, a light-weight image stabilizing lens unit is preferable and the number of lenses is desirably made small. However, when the large aperture is realized, a diameter of luminous flux of the on-axis ray becomes larger and optical performance is deteriorated due to coma aberration variation at the time of the image stabilization.

For the above-described reason, in the imaging optical system, it is important to efficiently cancel out the aberration occurring in the image stabilizing lens unit Gis including a small number of lenses by another lens unit such that the aberration may be sufficiently corrected also at the time of the image stabilization using a small number of lenses. Therefore, in the optical system of each embodiment, the cemented lens Lc with negative refractive power as a whole obtained by cementing the lens with positive refractive power and the lens with negative refractive power as a supplementary lens unit is arranged on the object side of the image stabilizing lens unit Gis.

According to this, sufficient aberration correction may be performed even with a small number of lenses. Since the image stabilizing lens unit Gis includes one lens (image stabilizing lens), the image stabilizing lens unit Gis is not excessively heavy also when a large aperture ratio is realized and it becomes easy to compose the image stabilizing lens unit without a large burden on the image stabilizing driving mechanism. Since the refractive power with different signs is applied to the image stabilizing lens unit Gis and the supplementary lens unit Lc adjacent to the same in this manner, it becomes easy to apply appropriate image shaking sensitivity to the image stabilizing lens unit Gis.

In each embodiment, the image stabilizing lens unit Gis is displaced in a direction including a component perpendicular to the optical axis for the image stabilization to correct the image shake caused by vibration such as a camera shake. Herein, the "direction including the component in the direction orthogonal to the optical axis" includes not only a direction orthogonal to the optical axis but also a direction shifted from the direction orthogonal to the optical axis (for example, a direction inclined with respect to the direction orthogonal to the optical axis and a rotation direction around a point on the optical axis).

In each embodiment, the focal length of the entire system is set to f, the focal length of the image stabilizing lens unit Gis is set to fis, and the focal length of the cemented lens Lc is set to fc. A distance on the optical axis from the aperture diaphragm SP to a lens surface on an aperture diaphragm SP side of the image stabilizing lens unit Gis is set to Dis and the distance on the optical axis from a first lens surface on the object side to a final lens surface when the infinite-distance object is brought into focus is set to DL. At that time, condition equations $$0.00 < Dis/DL < 0.25 \quad (1),$$

$$0.3 < fis/f < 3.5 \quad (2), \text{ and}$$

$$0.3 < -fc/fis < 3.5 \quad (3)$$

are satisfied.

Herein, the "distance on the optical axis" in a direction from the object side to the image side is with a positive sign and that in an opposite direction (direction from the image side to the object side) is with a negative sign.

Next, a technical meaning of each condition equation described above is described. The condition equation (1) represents a condition for realizing an appropriate distance on the optical axis from the aperture diaphragm SP to the lens surface closest to the aperture diaphragm SP of the image stabilizing lens unit Gis.

When the image stabilizing lens unit Gis is too much away from the aperture diaphragm SP toward the image side beyond an upper limit of the condition equation (1), the effective diameter of the image stabilizing lens unit Gis adversely increases. The incident height of the off-axis ray, which passes through the image stabilizing lens unit Gis, from the optical axis also becomes higher, so that the aberration correction of the off-axis ray at the time of the image stabilization becomes difficult. When the image stabilizing lens unit Gis gets so closer to the aperture diaphragm SP as to approach a lower limit of the condition equation (1), interference between the aperture diaphragm SP and the image stabilizing lens unit Gis adversely easily occurs. Meanwhile, a numerical range of the condition equation (1) is more preferably set as follows:

$$0.00 < Dis/DL < 0.07 \quad (1a).$$

The condition equation (2) is the condition equation for maintaining sensitivity in aberration variation and sensitivity in displacement of an image position in a balanced manner when the image stabilizing lens unit Gis is displaced in the direction perpendicular to the optical axis by realizing an appropriate ratio of the focal length of the image stabilizing lens unit Gis to the focal length of the entire system. When the refractive power of the image stabilizing lens unit Gis becomes weaker beyond the upper limit of the condition equation (2), an amount of movement in the direction including the component in the direction perpendicular to the optical axis becomes larger at the time of the image stabilization, so that the driving mechanism becomes larger.

When the refractive power of the image stabilizing lens unit Gis becomes stronger beyond the lower limit of the condition equation (2), a large eccentric aberration occurs at the time of the image stabilization and the optical performance at the time of the image stabilization is adversely deteriorated. An amount of change of the image position with respect to an amount of displacement of the image stabilizing lens unit Gis (hereinafter, referred to as the image shaking sensitivity) becomes large, so that the amount of displacement of the Image stabilizing lens unit Gis for obtaining a required image stabilization effect becomes too small and it becomes difficult to electrically or mechanically control the amount of displacement at high accuracy. The numerical range of the condition equation (2) is further preferably set as follows:

$$0.5 < fis/f < 3.0 \quad (2a).$$

The condition equation (3) is for appropriately setting refractive power balance between the image stabilizing lens unit Gis and the cemented lens (supplementary lens) Lc obtained by cementing the lens with positive refractive power and the lens with negative refractive power on the object side thereof. This is especially the condition equation for maintaining appropriate balance between aberration correction share and sensitivity in image position correction when the image stabilizing lens unit Gis is displaced in the direction perpendicular to the optical axis. In each embodiment, the cemented lens Lc is arranged on the object side of the image stabilizing lens unit Gis for inhibiting an axial chromatic aberration, which occurs when the appropriate refractive power balance is realized.

When the refractive power of the image stabilizing lens unit Gis becomes stronger beyond the upper limit of the condition equation (3), the larger eccentric aberration occurs at the time of the image stabilization and the optical performance is deteriorated. When the refractive power of the image stabilizing lens unit Gis becomes weaker beyond the lower limit of the condition equation (3), the image shaking sensitivity becomes too low and the amount of drive in the direction including the component perpendicular to the optical axis becomes larger at the time of the image stabilization, so that the driving mechanism becomes adversely larger. The numerical range of the condition equation (3) is further preferably set as follows:

$$0.5 < -fc/fis < 3.0 \qquad (3a).$$

In each embodiment, the above-described conditions are satisfied for obtaining a wide-view-angle lens, which makes it easy to obtain a compact image stabilizing lens unit Gis and makes it possible to obtain an excellent image also at the time of the image stabilization with the high optical performance. Also, in each embodiment, the lens with positive refractive power having an aspherical surface is preferably arranged on a side closest to the image plane. By arranging the lens with positive refractive power having an aspherical surface shape on a side closest to the image, tilt of a sagittal image plane may be reduced and it becomes easy to obtain the excellent optical performance also on the periphery of an image plane.

In each embodiment, one or more of following condition equations is desirably satisfied in order to obtain the high optical performance while maintaining the excellent optical performance at the time of the image stabilization. Lateral magnification of the image stabilizing lens unit Gis is set to βis and the lateral magnification of the lens unit arranged on the image side of the image stabilizing lens unit Gis is set to βr. The image stabilizing lens unit Gis includes the single lens and an Abbe number of a material of the single lens with respect to the d-line is set to vdis. At that time, one or more of the following condition equations is preferably satisfied:

$$0.1 < |(1-\beta is)\beta r| < 1.3 \qquad (4) \text{ and}$$

$$35 < vdis \qquad (5).$$

The condition equation (4) relates to a ratio between the amount of movement of the image stabilizing lens unit Gis in the direction perpendicular to the optical axis and an image point moving amount on an imaging plane generated according to this, and the larger this value is, the smaller the amount of movement for large and easy movement of the image point is. Hereinafter, a value of the condition equation (4) is referred to as the image shaking sensitivity.

When the image shaking sensitivity is too high beyond the upper limit of the condition equation (4), the amount of displacement (amount of movement) of the image stabilizing lens unit Gis for obtaining a certain image stabilization effect becomes too small and electrical or mechanical drive for the amount of movement at high accuracy becomes difficult. When the image shaking sensitivity is too low beyond the lower limit of the condition equation (4), the amount of movement so as to include the component in the direction perpendicular to the optical axis at the time of the image stabilization becomes larger and the driving mechanism adversely becomes larger. The numerical range of the condition equation (4) is further preferably set as follows:

$$0.2 < |(1-\beta is)\beta r| < 1.0 \qquad (4a).$$

The condition equation (5) relates to the Abbe number of the material of the image stabilizing lens, which composes the image stabilizing lens unit Gis, with respect to the d-line and is the condition equation for correcting especially a chromatic aberration such as the axial chromatic aberration and the magnification chromatic aberration out of the aberrations occurring at the time of the image stabilization in an excellent manner.

The image stabilizing lens unit Gis desirably includes as few lenses as possible for downsizing and weight saving. The image stabilizing lens unit Gis most preferably includes one positive lens or one negative lens. That is, the image stabilizing lens unit Gis most preferably includes the single lens. When the Abbe number of the material, which composes the image stabilizing lens unit Gis, is small beyond the lower limit of the condition equation (5), the chromatic aberration such as the axial chromatic aberration and the magnification chromatic aberration occurring at the time of the image stabilization becomes large and it becomes difficult to correct them. The numerical range of the condition equation (5) is further preferably set as follows:

$$40 < vdis \qquad (5a).$$

As described above, according to each embodiment, a so-called retrofocus-type optical system in which the focal length of the entire system is shorter than the back focus having the excellent optical performance without large various aberrations occurring at the time of the image stabilization is obtained. At the same time, a compact optical system having a simple lens configuration in which an excessive load does not occur in the mechanism for driving the image stabilizing lens unit is easily obtained.

Next, an embodiment of a single-lens reflex camera system (imaging apparatus) in which the optical system of an embodiment of the present invention is used is described with reference to FIG. 13. In FIG. 13, reference numerals 10 and 11 represent a single-lens reflex camera main body and an interchangeable lens equipped with the optical system according to an embodiment of the present invention, respectively. A reference numeral 12 represents a recording unit such as a film and an image sensing device for recording a subject image obtained through the interchangeable lens 11. Reference numerals 13 and 14 represent a viewfinder optical system for observing the subject image from the interchangeable lens 11 and a quick-return mirror, which rotates, for transmitting the subject image formed by the interchangeable lens 11 to the recording unit 12 and the viewfinder optical system 13 in a switching manner.

When the subject image is observed in the viewfinder, the subject image formed on a focusing plate 15 through the quick-return mirror 14 is made an erect image by a pentagonal prism 16 and enlarged to be observed by an eyepiece optical system 17. At the time of shooting, the quick-return mirror 14 rotates in a direction indicated by an arrow and the subject image is formed on the recording unit 12 to be recorded. Reference numerals 18 and 19 represent a sub mirror and a focus detecting unit, respectively. It is possible to realize the imaging apparatus having the high optical performance by applying the optical system of an embodiment of the present invention to the imaging apparatus such as the interchangeable lens of the single-lens reflex camera and the like in this manner. Meanwhile, the optical system of an embodiment of the present invention may also be applied to a mirrorless camera without the quick-return mirror.

First to fourth numerical embodiments corresponding to the first to fourth embodiments, respectively, are hereinafter described. In each numerical embodiment, reference signs i and ri represent an order of surfaces from the object side and a curvature radius of i-th one (i-th surface), respectively. A reference sign di represents an interval between the i-th surface and an (i+1)-th surface. Reference signs ndi and vdi represent a refractive index and the Abbe number based on the d-line, respectively. A reference sign BF represents the back focus. The surface with a mark * is the aspherical surface. (Aspherical surface data) indicates an aspherical surface coefficient when the aspherical surface is represented by an equation $$x = (h^2/R)/[1+\{1-(1+k)(h/R)^2\}^{1/2} + A4 \cdot h^4 + A6 \cdot h^6 + A8 \cdot h^8 + A10 \cdot h^{10} + A12 \cdot h^{12},$$

wherein
x represents an amount of displacement from a reference plane in the optical axis direction,
h represents a height in the direction perpendicular to the optical axis, and
R represents a radius of a secondary curved surface, which is a base.

Reference signs A4, A6, A8, A10, and A12 are fourth-order, sixth-order, eighth-order, tenth-order, and twelfth-order aspherical surface coefficients, respectively. Meanwhile, representation "e-Z" is intended to mean "$10^{-z}$". A relationship between each of the above-described condition equations and various values in the numerical embodiments is indicated in table 1.

First Numerical Embodiment unit: mm

Surface Data

| surface number | r | d | nd | vd |
|---|---|---|---|---|
| 1 | 107.841 | 2.00 | 1.48749 | 70.2 |
| 2 | 36.325 | 3.37 | | |
| 3 | 60.900 | 4.53 | 1.77250 | 49.6 |
| 4 | 253.393 | 9.91 | | |
| 5 | 478.362 | 1.50 | 1.58144 | 40.8 |
| 6 | 19.063 | 9.05 | | |
| 7 | 32.422 | 4.55 | 1.88300 | 40.8 |
| 8 | −98.623 | 3.98 | | |
| 9 | −54.460 | 3.64 | 1.88300 | 40.8 |
| 10 | −20.463 | 1.00 | 1.61293 | 37.0 |
| 11 | 63.422 | 3.24 | | |
| 12 (diaphragm) | ∞ | 2.68 | | |
| 13 | 69.180 | 2.29 | 1.69680 | 55.5 |
| 14 | −128.073 | 5.46 | | |
| 15 | −15.746 | 0.95 | 1.73800 | 32.3 |
| 16 | −131.434 | 4.37 | 1.59522 | 67.7 |
| 17 | −18.862 | 0.20 | | |
| 18* | −91.820 | 3.48 | 1.58313 | 59.4 |
| 19 | −23.365 | | | |

Aspherical Surface Data

18th surface

K = 0.00000e+000 A 4 = −1.49529e−005 A 6 = 4.91763e−009
A 8 = −4.11063e−011

| | |
|---|---|
| focal length | 34.49 |
| F number | 2.05 |
| half angle of view (degree) | 32.10 |
| image height | 21.64 |
| total lens length | 104.50 |
| BF | 38.30 |

Second Numerical Embodiment unit: mm

Surface Data

| surface number | r | d | nd | vd |
|---|---|---|---|---|
| 1 | 132.460 | 2.00 | 1.62299 | 58.2 |
| 2 | 34.266 | 4.76 | | |
| 3 | 93.710 | 4.21 | 1.77250 | 49.6 |
| 4 | −524.055 | 9.95 | | |
| 5 | 68.381 | 1.50 | 1.60562 | 43.7 |
| 6 | 22.966 | 7.04 | | |
| 7 | 27.744 | 6.32 | 1.83481 | 42.7 |
| 8 | −106.109 | 2.76 | | |
| 9 | −52.472 | 3.53 | 1.83400 | 37.2 |
| 10 | −23.397 | 1.10 | 1.59551 | 39.2 |
| 11 | 36.125 | 3.72 | | |
| 12 (diaphragm) | ∞ | 2.35 | | |
| 13 | 72.096 | 2.30 | 1.72916 | 54.7 |
| 14 | −124.797 | 5.65 | | |
| 15 | −14.420 | 1.00 | 1.78472 | 25.7 |
| 16 | −102.223 | 3.96 | 1.83481 | 42.7 |
| 17 | −20.023 | 0.20 | | |
| 18* | −58.818 | 4.29 | 1.58313 | 59.4 |
| 19 | −20.458 | | | |

Aspherical Surface Data

18th surface

K = 0.00000e+000 A 4 = −1.82729e−005 A 6 = 3.11467e−008
A 8 = −5.17296e−010 A10 = 2.93372e−012 A12 = −5.92984e−015

| | |
|---|---|
| focal length | 34.49 |
| F number | 2.02 |
| half angle of view (degree) | 32.10 |
| image height | 21.64 |
| total lens length | 104.24 |
| BF | 37.58 |

Third Numerical Embodiment unit: mm

Surface Data

| surface number | r | d | nd | vd |
|---|---|---|---|---|
| 1 | 71.195 | 2.00 | 1.48749 | 70.2 |
| 2 | 36.050 | 3.76 | | |
| 3 | 63.886 | 4.12 | 1.77250 | 49.6 |

-continued unit: mm

| | | | | |
|---|---|---|---|---|
| 4 | 221.701 | 11.17 | | |
| 5 | −214.904 | 1.50 | 1.58144 | 40.8 |
| 6 | 19.706 | 8.54 | | |
| 7 | 37.566 | 4.39 | 1.88300 | 40.8 |
| 8 | −77.437 | 4.20 | | |
| 9 | −49.840 | 3.75 | 1.88300 | 40.8 |
| 10 | −19.588 | 1.00 | 1.60342 | 38.0 |
| 11 | 202.255 | 2.40 | | |
| 12 (diaphragm) | ∞ | 2.64 | | |
| 13 | 98.946 | 1.79 | 1.72916 | 54.7 |
| 14 | −203.419 | 5.7 | | |
| 15 | −15.432 | 0.95 | 1.68893 | 31.1 |
| 16 | −78.954 | 4.52 | 1.49700 | 81.5 |
| 17 | −17.330 | 0.20 | | |
| 18* | −104.072 | 3.57 | 1.58313 | 59.4 |
| 19 | −23.339 | | | |

Aspherical Surface Data

18th surface

K = 0.00000e+000  A 4 = −1.57839e−005  A 6 = 8.94837e−009
A 8 = −5.94828e−011

| | |
|---|---|
| focal length | 34.5 |
| F number | 2.05 |
| half angle of view (degree) | 32.09 |
| image height | 21.64 |
| total lens length | 104.5 |
| BF | 38.3 |

Fourth Numerical Embodiment unit: mm

Surface Data

| surface number | r | d | nd | vd |
|---|---|---|---|---|
| 1 | 156.683 | 2.00 | 1.48749 | 70.2 |
| 2 | 39.154 | 3.56 | | |
| 3 | 75.419 | 4.65 | 1.77250 | 49.6 |
| 4 | −24596.307 | 10.41 | | |
| 5 | −220.720 | 1.50 | 1.58144 | 40.8 |
| 6 | 19.974 | 7.76 | | |
| 7 | 32.644 | 4.39 | 1.88300 | 40.8 |
| 8 | −112.408 | 4.77 | | |
| 9 | −61.668 | 3.78 | 1.88300 | 40.8 |
| 10 | −20.465 | 1.00 | 1.62004 | 36.3 |
| 11 | 114.664 | 2.62 | | |
| 12 (diaphragm) | ∞ | 2.52 | | |
| 13 | 74.645 | 2.15 | 1.72916 | 54.7 |
| 14 | −129.232 | 5.32 | | |
| 15 | −16.296 | 0.95 | 1.73800 | 32.3 |
| 16 | −293.682 | 5.27 | 1.59522 | 67.7 |
| 17 | −20.362 | 0.20 | | |
| 18* | −67.364 | 3.35 | 1.58313 | 59.4 |
| 19 | −22.066 | | | |

Aspherical Surface Data

18th surface

K = 0.00000e+000  A 4 = −1.61559e−005  A 6 = 3.74810e−009
A 8 = −5.07547e−011

| | |
|---|---|
| focal length | 34.47 |
| F number | 2.05 |
| half angle of view (degree) | 32.11 |
| image height | 21.64 |
| total lens length | 104.5 |
| BF | 38.3 |

TABLE 1

| Condition equations | First embodiment | Second embodiment | Third embodiment | Fourth embodiment |
|---|---|---|---|---|
| (1) | 0.040 | 0.035 | 0.040 | 0.038 |
| (2) | 1.88 | 1.83 | 2.65 | 1.89 |
| (3) | 1.23 | 0.71 | 1.81 | 2.30 |
| (4) | 0.614 | 0.603 | 0.432 | 0.613 |
| (5) | 55.5 | 54.7 | 54.7 | 54.7 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-072806, filed Mar. 28, 2012, which is hereby incorporated by reference herein in its entirety.

What is claimed is:

1. An optical system having a focal length shorter than a back focus, comprising:
a first lens unit with positive or negative refractive power,
a second lens unit with positive refractive power in order an object side to an image side;
wherein the first lens unit is not moved during focusing and the second lens unit moves during focusing,
the second lens unit includes an image stabilizing lens unit moving in a direction including a component perpendicular to an optical axis to move an imaging position, the image stabilizing lens unit is arranged at a position adjacent to an aperture diaphragm on an image side, and a cemented lens obtained by cementing a positive lens and a negative lens, the cemented lens being arranged on an object side of the aperture diaphragm,
where a focal length of the optical system is set to f, a focal length of the image stabilizing lens unit is set to fis, a focal length of the cemented lens is set to fc, a distance on the optical axis from the aperture diaphragm to a lens surface on the object side of the image stabilizing lens unit is set to Dis, and a distance from a lens surface on a side closest to an object side of the optical system to a lens surface on a side closest to an image side of the optical system on the optical axis with the optical system is focused on an infinite-distance object is set to DL, conditional expressions $0.00 < Dis/DL < 0.25$, $0.3 < fis/f < 3.5$, and $0.3 < -fc/fis < 3.5$ are satisfied.

2. The optical system according to claim 1, wherein lateral magnification of the image stabilizing lens unit is set to βis and lateral magnification of a lens unit arranged on an image side of the image stabilizing lens unit is set to βr, a conditional expression $0.1 < |(1−βis)βr| < 1.3$ is satisfied.

3. The optical system according to claim 1, wherein the image stabilizing lens unit includes a single lens and where an Abbe number of a material of the single lens with respect to a d-line is set to vdis, a conditional expression $35 < vdis ≤ 55.5$ is satisfied.

4. The optical system according to claim 1, wherein the first lens unit includes a negative lens in a meniscus shape having a convex surface on the object side and a positive lens in order from the object side to the image side, and the second lens unit includes a negative lens in a meniscus shape having a concave surface on the image side, a positive lens, the cemented lens obtained by cementing the positive lens and the negative lens, the aperture diaphragm, the image stabilizing lens unit which is a cemented lens obtained by cementing a negative lens and a positive lens, and a positive lens in order from the object side to the image side.

5. The optical system according to claim 1, wherein a lens on the side closest to the image side is a positive lens having an aspherical surface.

6. An optical system according to claim 1, wherein the first lens unit consists of a negative lens and a positive lens arranged in order from an object side to an image side.

7. An optical system according to claim 1, wherein the image stabilizing lens unit consists of one positive lens.

8. An image pickup apparatus, comprising:
an optical system having a focal length shorter than a back focus;
an image pickup element configured to receive light of an image formed by the optical system,
wherein the optical system includes a first lens unit with positive or negative refractive power;
a second lens unit with positive refractive power in order from an object side to an image side,
wherein the first lens unit is not moved during focusing and the second lens unit moves during focusing,
the second lens unit includes an image stabilizing lens unit moving in a direction including a component perpendicular to an optical axis to move an image position, the image stabilizing lens unit being arranged at a position adjacent to an aperture diaphragm on an image side, and a cemented lens obtained by cementing a positive lens and a negative lens is arranged on an object side of the aperture diaphragm,
where a focal length of the optical system is set to f, a focal length of the image stabilizing lens unit is set to fis, a focal length of the cemented lens is set to fc, a distance on the optical axis from the aperture diaphragm to a lens surface on the object side of the image stabilizing lens unit is set to Dis, and a distance from a lens surface on a side closest to an object side of the optical system to a lens surface on a side closet to an image side of the optical system on the optical axis with the optical system is focused on an infinite-distance object is set to DL, conditional expressions $0.0 < Dis/DL < 0.25$, $0.3 < fis/f < 3.5$, and $0.3 < -fc/fix < 3.5$, are satisfied.

* * * * *